United States Patent [19]

Mankovitz

[11] Patent Number: 5,577,108
[45] Date of Patent: Nov. 19, 1996

[54] INFORMATION DISTRIBUTION SYSTEM WITH SELF-CONTAINED PROGRAMMABLE AUTOMATIC INTERFACE UNIT

[76] Inventor: Roy J. Mankovitz, 18057 Medley Dr., Encino, Calif. 91316

[21] Appl. No.: 101,612

[22] Filed: Aug. 3, 1993

[51] Int. Cl.[6] .................................................. H04M 11/00
[52] U.S. Cl. ........................... 379/97; 379/100; 358/402; 358/403; 358/438
[58] Field of Search ..................... 379/100, 93, 96–99, 379/90, 110, 212–214, 354–357; 358/400, 402, 403, 407, 434–436, 442, 468, 438–440

[56] References Cited

U.S. PATENT DOCUMENTS

| | | | |
|---|---|---|---|
| 4,340,783 | 7/1982 | Sugiyama et al. | 379/100 |
| 4,405,829 | 9/1983 | Rivest et al. | 178/22.1 |
| 4,602,340 | 7/1986 | Appelberg | 364/492 |
| 4,646,160 | 2/1987 | Iizuka et al. | 358/257 |
| 4,754,335 | 6/1988 | Izawa et al. | 358/256 |
| 4,893,333 | 1/1990 | Baran et al. | 379/100 |
| 4,905,273 | 2/1990 | Gordon et al. | 379/100 |
| 4,918,722 | 4/1990 | Duebren et al. | 379/100 |
| 4,935,954 | 6/1990 | Thompson et al. | 379/96 |
| 4,941,170 | 7/1990 | Herbst | 379/100 |
| 4,974,254 | 11/1990 | Perine et al. | 379/100 |
| 4,991,200 | 2/1991 | Lin | 379/100 |
| 5,016,115 | 5/1991 | Calkins | 358/442 |
| 5,041,918 | 8/1991 | Ishida et al. | 358/442 |
| 5,048,078 | 9/1991 | Satomi et al. | 379/100 |
| 5,065,427 | 11/1991 | Godbole | 379/100 |
| 5,068,888 | 11/1991 | Scherk et al. | 379/100 |
| 5,136,634 | 8/1992 | Rae et al. | 379/100 |
| 5,153,744 | 10/1992 | Nobuta | 358/400 |
| 5,196,943 | 3/1993 | Hersee et al. | 358/403 |
| 5,262,860 | 11/1993 | Fitzpatrick et al. | 358/461 |
| 5,369,689 | 11/1994 | Kawamura | 379/110 |

FOREIGN PATENT DOCUMENTS

| | | | |
|---|---|---|---|
| 2211698 | 7/1989 | United Kingdom | 379/100 |

OTHER PUBLICATIONS

Advertisement, *Faxfacts*, Copia International Ltd. Sep. 8, 1994.
Brochure, *RobofaxEZ* Add★on America, Fax Date Nov. 10, 1992.
*Using the Fax–250 Polling and Broadcast Features*, Brother Fax–250 Owner's Manual, date unknown, Section 6.
Advertisement, "Send Callers instant info by fax—on their dime." Hello Catalog, p. 27, Fax Date Nov. 10, 1992.

*Primary Examiner*—Wing F. Chan
*Attorney, Agent, or Firm*—Christie, Parker & Hale, LLP

[57] ABSTRACT

The information distribution system is a self-contained automatic interface unit for connecting an information receiver such as a FAX machine to an information and retrieval system on a predetermined schedule to obtain a predetermined set of information selected by the user. Programming of the interface unit by the user allows selection of schedule and information desired from an updated database source such as a stock quotation reporting system. Alteration of the selected times and desired information by the user through reprogramming of the interface unit allows the user to obtain only the desired information and allows autonomous operation of the information distribution system.

11 Claims, 3 Drawing Sheets

INFORMATION DISTRIBUTION SYSTEM WITH SELF-CONTAINED PROGRAMMABLE AUTOMATIC INTERFACE UNIT

BACKGROUND OF THE INVENTION

1. Field of the Invention

The present invention relates generally to the field of distribution of updated database information to individual users or subscribers upon user request. More particularly, the invention provides a self-contained automatic interface unit for connecting an information receiver to an information and retrieval system on a predetermined schedule to obtain a predetermined set of information selected by the user. The interface unit is reprogrammable to allow alteration of the selected times and desired information and provides control capability for interfacing an information and retrieval system and information receiver, both of which require call in connection.

2. Prior Art

Delivery of current database information to individual requestors or subscribers has become a growing industry, particularly, in the field of financial information, stock quotations, commodities quotations and other rapidly changing data. The updated data are provided to users through numerous formats and equipment structures.

Electronic mail systems allow direct communication between personal computers for transfer of information between users, and voice massaging systems allow unattended call-in by interested subscribers to receive audible updates of various information.

Certain information systems allow a subscriber to dial in to an "E-mail" system, select information which is desired using the key pad of the telephone and transfer the call to a FAX machine to receive the data in hard copy format. These systems require direct user interaction to initiate the call, select the information desired and accomplish the transfer of the call to the FAX machine for transfer.

In commercial use, systems are offered wherein the user dials in to the information service, uses extension numbers or menu selections, provided verbally by the service, to select the desired information and then receives the information verbally from the system. An issue which arises with this type of information transfer is cost effective billing for the service by the provider. In some instances, advertisements are interspersed in the data to provide indirect income for the supplier, while the user is only directly charged for the local telephone call.

Alternate systems employ a "900 number" providing direct payment to the service provider for the service through telephone billings. These systems are simple in operation, however, the user must remain on the telephone to receive the information verbally, thereby preventing implementation of an unattended data recovery system.

Conventional telephone FAX services are available for subscribers paying a monthly fee. This service typically requires the user to presubscribe and to predesignate data selections. The equipment of the service provider then dials out to each subscribers FAX machine transmitting data corresponding to the designated data selections at an interval determined by the service. Subscription fees for these services are relatively expensive and the service provider incurs substantial telephone charges which must be amortized in the subscription costs. This system provides unattended operation and employs current facsimile equipment. Designation of new data selections requires extensive administrative changes by both the subscriber and the service, and frequency of data distribution is often not customized to the subscriber or, if customized, requires the previously described administrative steps for altering the frequency of delivery.

Standard computer database services are offered by numerous companies wherein users presubscribe for a monthly fee to allow access to the database and, in addition, in some services, pay an on-line charge based on time spent in accessing the service. Typically, these systems require a personal computer and are not amenable to unattended operation since the systems are directly interactive with the user for choices of data desired, storage and/or printing of the selected data, and general log-on/log-off procedures. Telephone charges are born by the user in these system implementations.

Standard telephone E-mail systems are provided by major telephone companies allowing computer users to communicate with other users by data storage in preassigned E-mail boxes. This data can then be accessed by third parties with a special key code or may be automatically broadcast to several designated mail boxes. Generally, a monthly fee is required as well as a transaction fee from the subscriber to the service. These systems require a computer interface and do not interact directly with FAX machines. Operation of these systems, from the user standpoint, is not easily automated for unattended operation.

Alternate services in the E-mail systems allow users to call in for FAXES which have been stored in their E-mail box for transmission to a FAX machine. This system requires user interaction to establish the transfer and does not allow any selection of various information to be received.

FAX information systems for mail order catalogs and other information services have been established to provide additional product data or information to a potential buyer. The catalog includes an "800 number" and limited product information. Contained within each product advertisement is an extension number for additional information by facsimile. The reader is instructed to call the 800 number, enter his FAX number, along with the extension number and hang-up. The catalog company then dials the readers FAX machine and FAXES the requested information. This system is expensive and cumbersome requiring two telephone calls per request and requires that the service provider carry the cost of at least one of the telephone calls or both calls if an 800 number is used. This information system is not amenable to unattended operation and is not easily adaptable to timed distribution of updated information.

The final prior art system presently available incorporates a radio broadcast system for updating information. The interface unit requires an RF receiver and substantial random access memory, or other storage capability, to receive the broadcast updates. Advantages of the system are that the variable cost per message delivery to the information provider is essentially zero. Further, the system can be operated by the information receiver in an unattended mode, however, selection of information requested is not possible. The entire RF broadcast is received as transmitted. Consequently, selection must be accomplished from the data stored at the user interface leading to the large memory/storage requirements.

The present invention alleviates the shortcomings of the prior art devices by providing a system which will operate unattended and may be used with currently available facsimile equipment.

SUMMARY OF THE INVENTION

The information distribution system of the present invention incorporates an automatic self-contained interface unit for unattended control and connection of an information and retrieval system to an information receiver. The interface unit incorporates the capability for connecting an information receiver in the form of a FAX machine or other receive only type data terminal to a telephone line. The interface unit is capable of making outgoing communications for control of the information and retrieval system and the information receiver, while incorporating a receiving system for receiving signals from both systems on the telephone line. A hold circuit is provided in the interface unit for placing the telephone line on hold during interactive communications with one system element.

A controller integral to the interface unit provides for unattended operation of the system by activating the connection of the telephone line at a predetermined time, and upon response from the information and retrieval system, issuing a set of predetermined commands for retrieving the desired information. Upon receiving a proper cue from the information and retrieval system, the controller places the telephone line on hold and provides commands to the information receiver to prepare the receiver for information to be transmitted over the telephone line. Upon receiving a confirmation of the readiness of the information receiver, the controller takes the line off hold, connecting the information and retrieval system and the information receiver.

The information and retrieval system of the data distribution system incorporates a computerized data distribution system, which receives updated information to be selectively transmitted to subscribers. The computer sorts and formats the data and provides data to specific FAX mail boxed in an E-mail system, which incorporates control capability for accessing of multiple selected mail boxes in a single communication for downloading of the FAX transmissions stored in the mail boxes. Selection of the mail boxes to be downloaded is accomplished by the predetermined commands from the interface unit.

A password identification system and other data protection is incorporated in the E-mail system to allow access only by authorized subscribers.

In operation, the interface unit may be programmed by a subscriber to initiate contact with the information and retrieval system at a desired frequency, i.e., once, daily, weekly or other user selected interval, and information selection is accomplished by designation of the mailboxes to be addressed in the contact. Further interaction by the subscriber with the system is unnecessary until changes are desired in the frequency of access or the information types desired.

BRIEF DESCRIPTION OF THE DRAWINGS

The present invention will be better understood in reference to the following drawings, and detailed description wherein.

DETAILED DESCRIPTION

Figure 1:
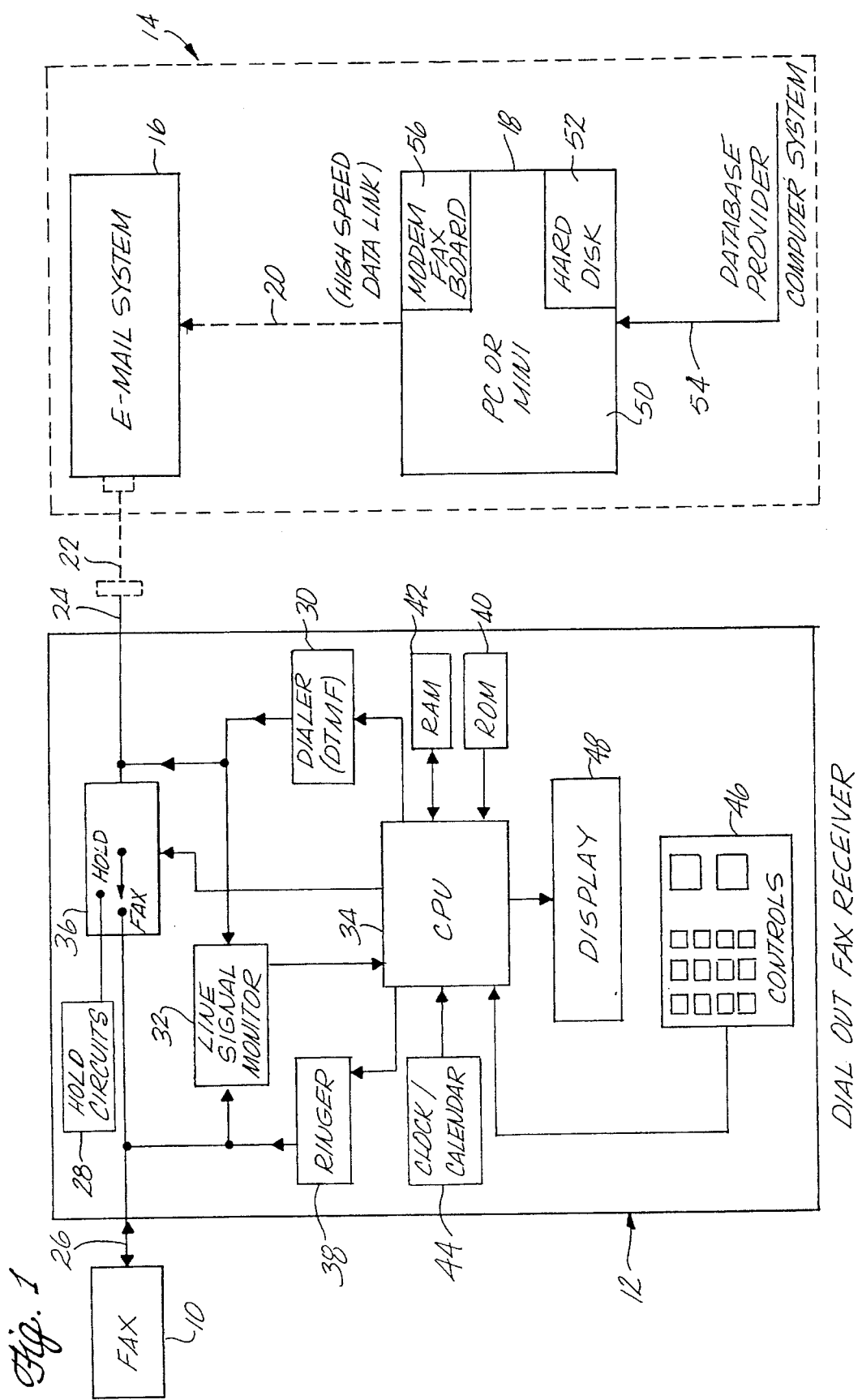
FIG. 1 is a block diagram schematic of the interface unit and general configuration of the information and retrieval system for connection to an information receiver.

An embodiment of the present invention adapted for use with a standard facsimile machine to take advantage of the invention's capability for use with preexisting equipment is shown in the drawings. Referring to FIG. 1, the information distribution system comprises an information receiver in the form of a FAX machine 10, an interface unit 12, and an information and retrieval system generally designated 14 which comprises an E-mail system 16, and a computer data distribution system 18 interconnected by a high-speed data link 20. The interface unit is set up for connection to a standard telephone line 22 in the public switched network.

The interface unit is connected to the public switched network through a standard phone jack connection 24 and to the facsimile machine through the phone jack interface 26. The interface unit incorporates a dialer circuit 30, which uses standard dual-tone multi-frequency (DTMF) codes for dialing out with a desired telephone number. The dialer circuit includes the capability for simulating "hook flash" for call initiation and termination signaling. A line signal monitor 32 receives signals transmitted over the connected telephone line which are then provided to a central processing unit (CPU) 34.

A controllable switch 36 is included in the line circuit to allow the line to be placed on hold using hold circuits 28 well known in the art. The normal position for this switch is the FAX position, whereby the FAX machine 10 is connected to the telephone line 22. A ringer circuit 38, also well known in the art, is connected for transmission of a ring signal to the information receiver 10.

The controllable switch, dialer circuit and ring circuit operate responsive to commands from the CPU. A read only memory (ROM) 40 and a random access memory (RAM) 42 are incorporated in the interface unit for instruction and data storage, respectively, for use by the CPU. A clock/calendar circuit 44 provides current time and date information to the CPU for timing purposes.

An input system incorporating a keyboard 46 is employed for data entry to the CPU. A display 48 is provided for display of the data input and prompt commands provided by the CPU for the data input. In the embodiment shown, the CPU is preprogrammed employing the ROM for prompting the input of predetermined command sequences to be described in greater detail subsequently. Those skilled in the art will recognize that an RS232 interface or other similar communications port could be employed in alternate embodiments to allow direct communication by the interface unit with a personal computer which acts as the input system and display for the CPU.

Figure 2A:
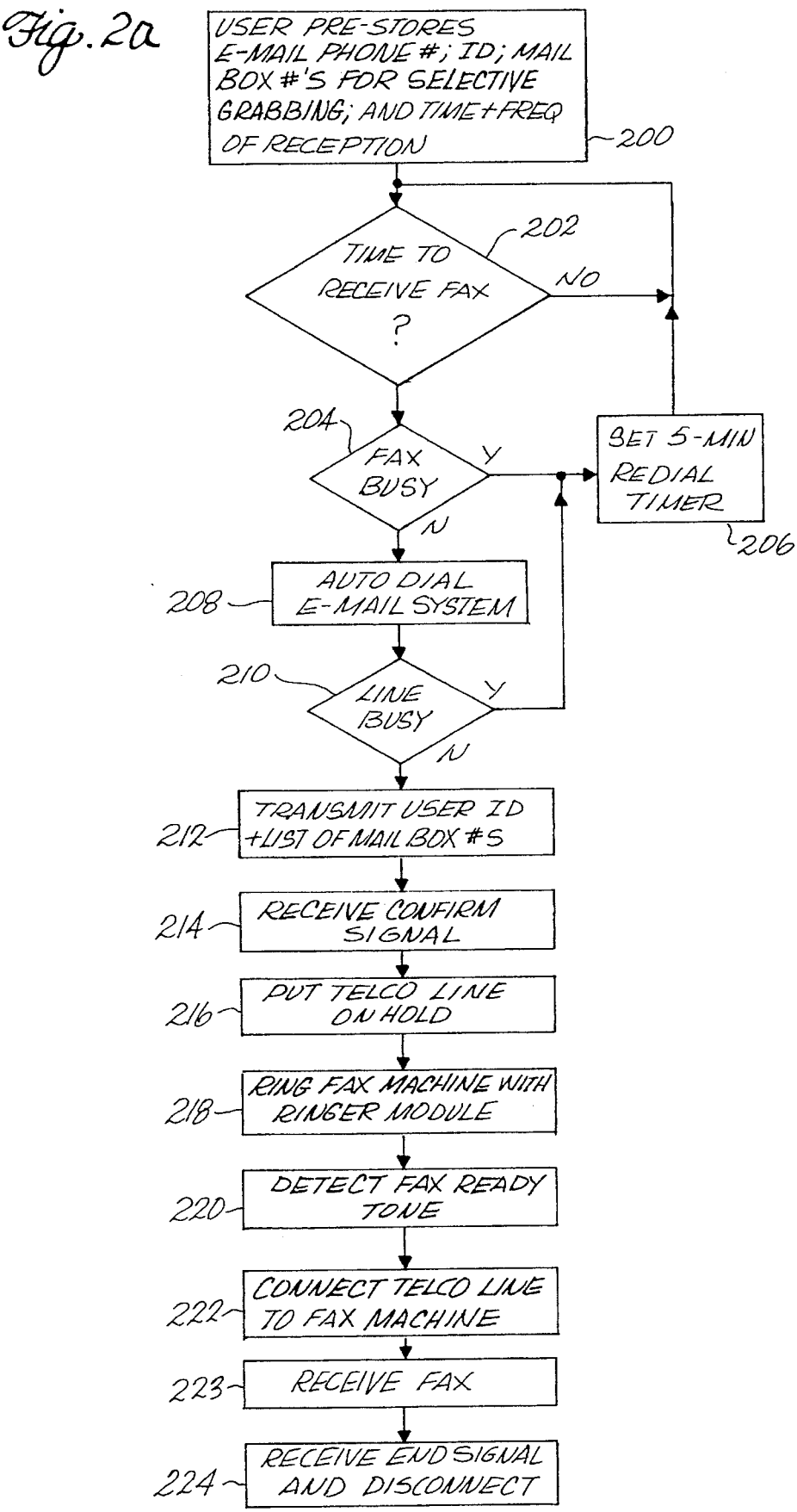
FIG. 2a is a flow chart of operations performed by the controller of the interface unit in initiating the telephone call and interconnecting the information and retrieval system to the information receiver.

In operation the interface unit provides interaction with the information and retrieval system and information receiver which cannot be accomplished by those units individually. Operation of the system is outlined in flow-diagram form in FIGS. 2a and 2b. The user receives from the service provider a catalog or other communication which provides a directory listing which may include a local phone number or a 900 number for access to the E-mail system. A list of extension numbers which correspond to index codes or designators identifying the various data available on the system is provided for a wide range of topics. This list can be periodically updated and expanded and is limited only by the number of E-mail box locations available.

The user prestores in the interface unit the phone number for the E-mail system comprising the interface for the information and retrieval system, an identification code or security code allowing access to the system, and the mail box numbers or data designators for the desired information to allow selective collection of that information. A time for reception and frequency of reception are entered. These steps are identified as block 200 in FIG. 2a.

The CPU in the interface unit then monitors the time and calendar circuit and when the selected time has been reached for system operation, block 202, the system determines if the facsimile machine comprising the information receiver is busy, block 204. This is accomplished in various embodiments by monitoring the FAX line directly employing the line signal monitor or alternatively, through the CPU issuing a ring command to the ringer circuit which is issued to the FAX machine resulting in a busy signal received by the line signal monitor and returned to the CPU. If the information receiver is busy, the CPU sets an internal timer to determine a redial interval, block 206. Upon expiration of the timer the information receiver is again polled to determine its availability.

After confirmation of the availability of the information receiver, the CPU provides data corresponding to the information and retrieval system telephone number to the dialer circuit which issues standard DTMF output for the telephone number, block 208. The public switched network completes the call to the information and retrieval system, which upon answer issues a ready cue, block 225 of FIG. 2b. If the information and retrieval system has all lines busy the line signal monitor transmits the busy signal to the CPU, block 210, which sets the dial timer for later call back.

The line signal monitor 32 transmits the ready cue to the CPU which then outputs a data string corresponding to a security access code and designators identifying various data desired from the information and retrieval system. This data string is transmitted through the dialer circuit using standard DTMF signaling, block 212 of FIG. 2a. Upon confirmation of the security code and acceptance of the designators for desired data, block 226 of FIG. 2b, the information and retrieval system stores the designators for the data as E-mail box data addresses, block 228, and issues a confirmation signal, block 230, which is received by the line signal monitor and transmitted to the CPU, block 214 of FIG. 2a.

Upon receiving the confirmation signal, the CPU activates the controllable switch 36 placing the telephone line circuit on hold, block 216. The ringer circuit is then activated by the CPU, block 218, issuing a ring tone to the information receiver 10. The facsimile machine comprising the information receiver in the present embodiment, receives the ring signal and goes off-hook into the receive mode, providing a standard FAX ready tone which is received by the line signal monitor and transmitted to the CPU, block 220. The CPU deactivates the controllable switch 36, taking the telephone line off hold, block 222, thereby allowing direct communication between the information receiver and information and retrieval system which continue the communication through standard dialogue protocols for facsimile transmission, block 223 and block 234. Upon completion of the transmission of data from the information and retrieval system to the information receiver, a standard end of message signal is provided by the information and retrieval system, block 235 causing the FAX to disconnect.

The CPU monitors the clock/calendar for the next program retrieval time at which time the above described sequence is repeated.

Figure 2B:
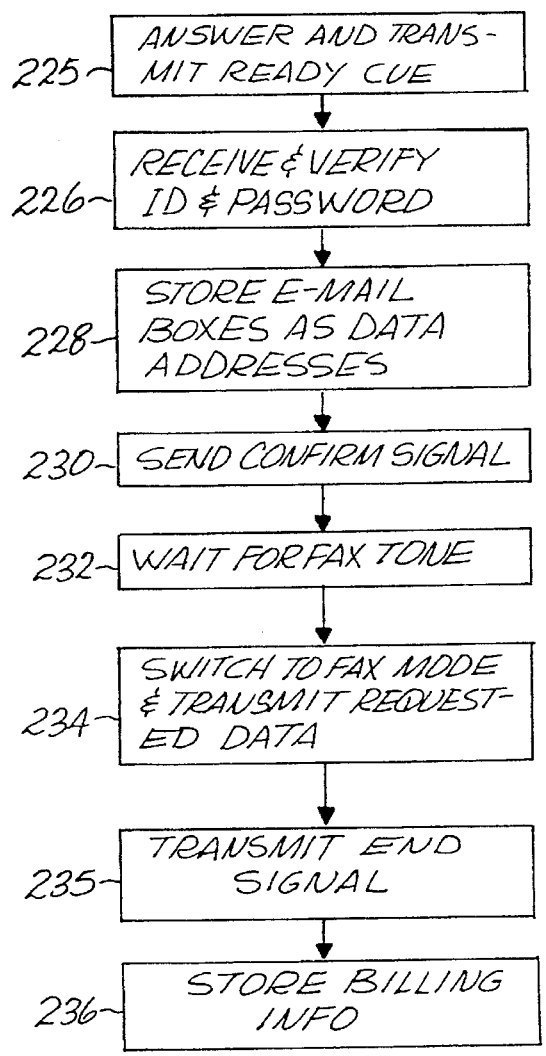
FIG. 2b is a flow chart of operations performed by the E-mail system incorporated as a portion of the information and retrieval system.
Figure 2C:
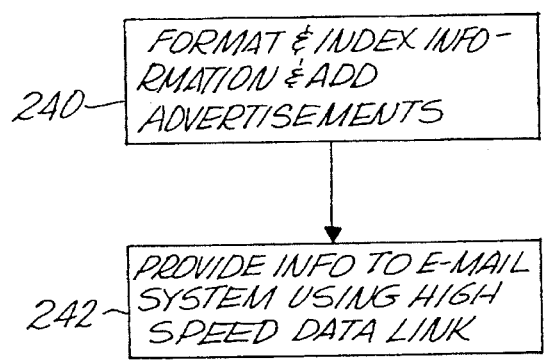
FIG. 2c is a flow chart of the operations performed by the data distribution computer in the information and retrieval system.

Upon completion of the data transfer, the information and retrieval system stores billing information corresponding to the data extracted by the interface unit and information receiver, block 236 of FIG. 2b. As previously described the present system allows for great flexibility on the part of the service provider in determining billing approaches for the service. All call expenses may be borne by the user since the system involves only call-in communications. If as a portion of the subscription service, it is desired to provide an 800 number for the service, this can be accomplished to allow the provider to bear a portion of the cost. In the alternative, if the provider desires additional billing capability, a 900 number may be employed for direct profit to the provider based on connection time. Billing information stored by the E-mail system, based on the number of mail boxes accessed, may then be employed by the service provider for billing of the user based on quantity of data received.

The computer data distribution system 18 comprising the second element of the information and retrieval system in the embodiment in the drawings, is a PC or mini computer 50 with data storage capability in the form of a hard disk 52 or other mass storage data device. The database provider inputs data for the various designated service information into the data distribution system through an interface 54. This interface may comprise a direct input or, in certain embodiments, comprises a download interface from a mainframe computer system operated by the provider for generation and storage of the database information. The information downloaded to the data distribution system is sorted and assigned to various E-mail boxes in the E-mail system. The updated data for each E-mail box is then converted to a facsimile format employing a modem FAX board 56. The data distribution system then communicates directly with the E-mail system over the high-speed data link downloading the FAX format information into the E-mail boxes for distribution to the users upon call-in. Flexibility in control programming of the data distribution system allows update of individual mail boxes or mass update of numerous mail boxes as new data arrives from the data base provider.

Having now described the invention in detail as required by the patent statute, those skilled in the art will recognize modifications and substitutions in the embodiments discloses herein. Such modifications and substitutions are within the scope and intent of the present invention as defined by the following claims.

What is claimed is:

1. An automatic self contained interface unit for unattended control and connection of an information and retrieval system to an information receiver comprising:

means for connecting a telephone line to the information receiver;

means for receiving telephonic signals from the connected telephone line;

means for transmitting telephonic signaling tones on the connected telephone line;

means for placing the connected telephone line on hold;

a controller connected to the connecting means, receiving means, transmitting means and hold means, said controller including:

means for activating the controller at a predetermined time;

means for transferring a predetermined set of commands to the transmitting means for transmission as signaling tones for dialing the information and retrieval means on the telephone line and, upon answer, an information data string to the information and retrieval system for defining selective collection and transmission of specific information;

means for interactively interpreting signals received by the receiving means;

means responsive to a first signal from the interpreting means for activating the hold means;

means for transferring a command to the transmitting means for transmission to the information receiver; and means responsive to a second signal from the interpreting means for deactivating the hold means thereby interconnecting the information receiver with the information and retrieval system.

2. An interface unit as defined in claim 1 wherein the transmitting means comprises a DTMF signal generator and a ring generator.

3. An interface unit as defined in claim 1 further comprising means for inputting commands to the controller for establishing the predetermined set of commands for the information and retrieval system.

4. An interface unit as defined in claim 3 wherein the input means comprises a keyboard, said controller further comprises means for generating predetermined prompts for input of selected commands for the predetermined set; and the unit further comprising a display for viewing of commands input to the controller on the keyboard and to provide prompts from the controller.

5. A method for connecting an information and retrieval system to an information receiver employing an interface unit having telephone signal receiving capability and signaling tone transmission capability, said methods comprising the steps of:

activating the interface unit at a predetermined time: determining if the information receiver is busy;

resetting the predetermined time for activation if the receiver is busy;

deactivating the interface unit until the new predetermined time;

dialing a predetermined number for the information and retrieval system;

transmitting a predetermined set of commands to the information and retrieval system for defining selective collection of information to be retrieved;

receiving an activation cue from the information and retrieval system;

placing the telephone line on hold; ringing the information receiver;

receiving a confirmation tone from the information receiver; and taking the telephone line off hold to allow communication between the information retrieval system and information receiver.

6. A method as defined in claim 5 wherein the interface unit includes a system for inputting selected predetermined commands for the information and retrieval system and wherein the method further comprises the preliminary steps of:

selecting information desired from the information and retrieval system;

entering commands on the input system corresponding to the information desired;

entering a predetermined time for activation of the interface system; and initiating operation of the interface system.

7. A method as defined in claim 5 wherein the step of transmitting a predetermined set of commands to the information and retrieval system is preceded by the steps of:

determining if the information and retrieval system is busy;

resetting the predetermined time for activation of the interface unit if the information and retrieval system is busy; and deactivating the interface unit until the new predetermined time.

8. An information distribution system comprising:

an information receiver having ring response capability;

an information and retrieval system having dial-in response capability and storing a plurality of data elements separately retrievable by a call-in user; and a self-contained interface unit having:

means for dial-in connection to the information and retrieval system;

means for designating information to be retrieved from the plurality of data elements stored in the information retrieval system;

means for ringing the information receiver; and means for interconnecting the information and retrieval system to the information receiver.

9. A data distribution system as defined in claim 8 wherein the interface unit comprises:

means for connecting a telephone line to the information receiver;

means for receiving telephonic signals from the connected telephone line;

means for transmitting telephonic signaling tones on the connected telephone line;

means for placing the connected telephone line on hold;

a controller connected to the connecting means, receiving means, transmitting means and hold means, said controller including:

means for activating the controller at a predetermined time;

means for transferring a predetermined set of commands to the transmitting means for transmission as signaling tones for dialing the information and retrieval means on the telephone line and, upon answer, an information data string to the information and retrieval system;

means for interactively interpreting signals received by the receiving means;

means responsive to a first signal from the interpreting means for activating the hold means;

means for transferring a command to the transmitting means for transmission to the information receiver; and means responsive to a second signal from the interpreting means for deactivating the hold means thereby interconnecting the information receiver with the information and retrieval systems.

10. An information distribution system as defined in claim 8 wherein the information and retrieval system comprises:

an E-mail system wherein the plurality of data elements comprise mail boxes; and a data distribution system comprising a computer for storage and sorting of provided information into data categories and transmission of said sorted data to the designated E-mail boxes.

11. A data distribution system as defined in claim 10 wherein the data distribution system incorporates a modem FAX board for conversion of sorted data to facsimile format and the E-mail boxes are configured for facsimile format storage and transmission, said information and retrieval system further comprising a high-speed data link connecting the modem FAX board to the E-mail system.

* * * * *